C. W. ARMBRUST.
BRAKE SHOE.
APPLICATION FILED MAY 26, 1916.
1,239,447.
Patented Sept. 11, 1917.
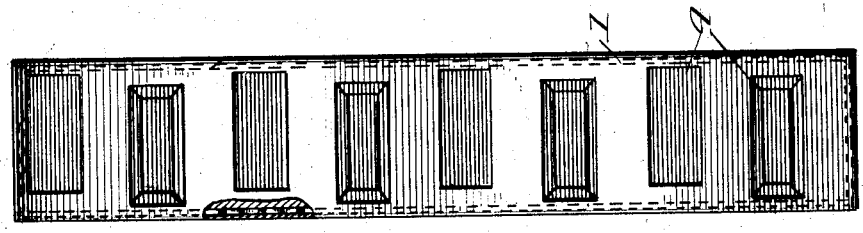
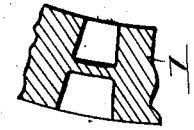 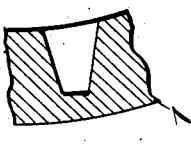
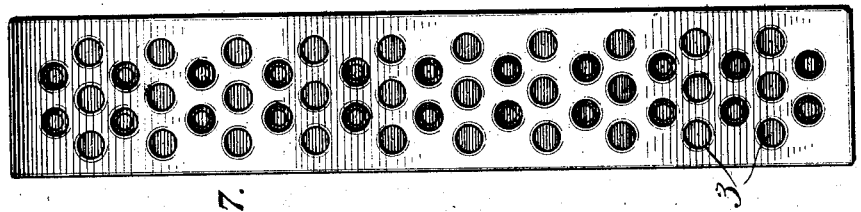
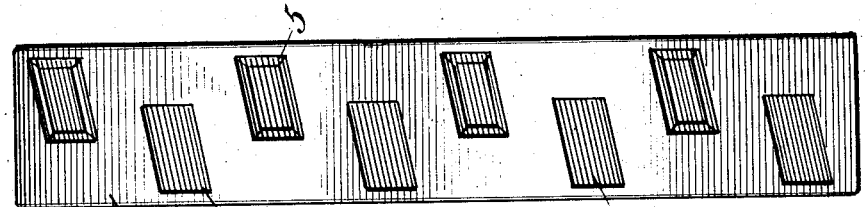
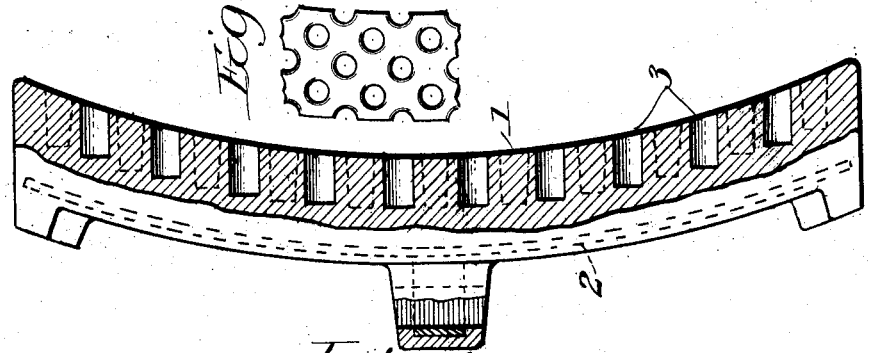
Inventor
Charles W. Armbrust

UNITED STATES PATENT OFFICE.

CHARLES W. ARMBRUST, OF CHICAGO, ILLINOIS, ASSIGNOR, BY MESNE ASSIGNMENTS, TO THE AMERICAN BRAKE SHOE & FOUNDRY COMPANY, OF WILMINGTON, DELAWARE, A CORPORATION OF DELAWARE.

BRAKE-SHOE.

1,239,447. Specification of Letters Patent. Patented Sept. 11, 1917.

Application filed May 26, 1916. Serial No. 99,937.

*To all whom it may concern:*

Be it known that I, CHARLES W. ARMBRUST, a citizen of the United States, residing at Chicago, in the county of Cook and State of Illinois, have invented a certain new and useful Improvement in Brake-Shoes, of which the following is a full, clear, concise, and exact description, reference being had to the accompanying drawings, forming a part of this specification.

My invention relates to brake shoes and has for its object the provision of an improved shoe of such construction that it is much lighter than shoes hitherto produced, and yet produces the necessary frictional resistance to serve its purpose.

As well understood, a brake shoe is used to retard the motion of a vehicle, and the retarding effect is due to the friction between the applied brake shoes and the wheels. For any given case, the amount of friction the retarding effect produces will depend on the materials of which the shoes are made, the weight of the car, and the pressure of the shoe against the wheel. According to the laws of friction we find that friction is directly proportional to the weight or force applied, but is independent of the surfaces in contact, the total friction remaining the same (within practical limits). Furthermore, the coefficient of friction varies with the speed and length of time the running surfaces are in contact. The coefficient of friction is used to figure the friction between two surfaces in sliding contact, and is determined by the nature of the materials in contact.

Rotation of the wheels in the case of a moving train is caused by the adhesion of tires or rims to the rails. Each point of the tire surface of a rotating wheel moves around at the same rate as the train moves forward, but when it comes in contact with the rail it is momentarily at rest in relation to the forward movement of the train. If pressure be applied to the shoe the wheel continues to revolve at a rate corresponding to the speed of the train, but the rotary motion is kept up with more difficulty under pressure than before so that if tractive force is not supplied the train will slow down and finally stop. If the pressure on the shoe is gradually increased the friction between wheel and shoe becomes greater and greater until it first equals and then exceeds the adhesion between the tires and the rail.

As stated above, the tire in contact with the rail being at rest momentarily with reference to the forward motion of the train, the adhesion must be caused by friction. When the friction of the shoe equals the adhesive force to the rails, the wheels skid along the rails and the resistance to its motion is equal to the frictional resistance to the sliding motion of the wheels along the rails. Thus it is seen that there are two cases.

First: The retarding force of the brake shoe against the wheel which is measured by the coefficient of friction between the shoe and wheel, by the pressure exerted against the shoe.

Second: The skidding of the wheels along the rail which force is measured by the coefficient of friction between rail and wheel by the weight on the wheel.

From the foregoing fact we see the rail acts in every sense the same as a brake shoe and bears out the second law of friction, that "friction is independent of the extent of the surfaces in sliding contact." In any given case the retarding power is limited to the adhesive force of the wheel to the rail, in which case the extent of the surfaces in sliding contact is practically only a line the width of the rail.

I find that in accordance with the above facts I am enabled to construct a brake shoe of which the area of the material pressing against the wheel is largely reduced without sacrificing any of the frictional value, and yet insuring longer life of the shoes.

In one form of the invention which will be described more in detail later I use a brake shoe whose outline is the same in size as that of the standard brake shoes. I however provide holes in this brake shoe to reduce the area of contact, thus saving a large amount of material, making the brake shoe cheaper. Furthermore the provision of these holes permits me to have chilled edges around them and thus to increase the life of the shoe over and beyond what is now obtainable.

I will explain various forms which my invention may take more in detail by referring to the accompanying drawing, in which—

Figure 1 is a partial longitudinal sectional view of a brake shoe constructed in accordance with my invention;

Fig. 2 is a front face view thereof;

Fig. 3 is a view similar to Fig. 2 of a modified form, and

Fig. 4 is a view similar to Fig. 2 of a modified form, and

Fig. 5, Fig. 6 and Fig. 7 are sectional views of further modifications of my improved shoe.

My improved brake shoe consists of the shoe portion 1 and the back portion 2 as well understood. In accordance with my invention I provide in the face of the shoe portion 1 a plurality of holes 3, 3, which holes extend backwardly into the brake shoe proper. These holes, as will be readily apparent, leave the brake shoe with a great deal less material than it has hitherto been customary to use. The reduction of the area of contact does not militate against the frictional value of the shoe. However, the arrangement of this plurality of holes permits the edges of the material around these holes to be chilled during the process of casting due to the normal chill which the material is given. In my improved shoe the holes are formed by the pattern in the mold by having the molten metal flow against the edges of the sand, thus to form the holes in the shoe body, especially by using a special mixture of metals with which to make and cast the shoe body, thus reducing the cost of manufacturing shoes very substantially and getting the chilling effect and its consequent extended life simply and cheaply. The shoe likewise has an equal distribution of chilled sections throughout its body and thus presents a more homogeneous structure. The holes furthermore allow the waste metal of the shoe and of the wheels to be largely accumulated therein as is readily apparent. In this manner a shoe having different degrees of hardness is obtained and the hard portions of the shoe are the elements which increase the life of the shoe by saving the wear of the softer portions between those chilled sections, which softer portions in connection with the chilled portions give the necessary frictional qualities.

In Fig. 3, I show a shoe 1 having however the holes 4, 4 larger and preferably staggered as shown, some of which are tapered; also showing the use of an expanded metal strip embedded in the sides and ends of the shoe to strengthen it and to hold fractured parts together.

In Fig. 4, I show a similar view, the shoe however being provided with diagonally placed holes again staggered as shown, some of which are tapered.

Fig. 5 shows a shoe having holes extending both toward the face and back of the shoe.

Fig. 6 is a sectional view showing one of the tapered holes in the shoe shown in Figs. 3 and 4.

Fig. 7 shows a structure in which the holes extend through from one side face of the shoe to the other side face.

It is of course within limits immaterial what style or outline is given the holes so long as the general principles above set forth are adhered to. I merely show the two modifications to indicate that I am not dependent upon a particular kind of recess or hole to accomplish the object desired.

Having however thus described one form which my invention may take, what I claim as new and desire to secure by Letters Patent is:

1. A brake shoe comprising a cast metal body, presenting a homogeneous wearing surface and having a plurality of openings uniformly distributed in said surface and extending into said body, whereby the weight of the shoe is lessened without destroying its efficiency.

2. A brake shoe having a wearing face portion provided with a plurality of holes extending from front to rear thereof, some of said holes being straight and some wedge-shape.

3. A brake shoe having a wearing face portion provided with a plurality of holes extending from front to rear thereof, some of said holes being straight and some wedge-shape, and a solid portion at the back of said holes.

4. A brake shoe having a wearing face portion provided with a plurality of holes extending from front to rear thereof and distributed in staggered relation throughout said wearing face portion, some of said holes being straight and parallel with each other and the rest of said holes being wedge-shape, and a solid portion at the back of said wearing face portion.

5. A brake shoe comprising a cast metal body, presenting a homogeneous wearing surface, and having a plurality of openings uniformly distributed in said surface and extending into said body and strengthening strips embedded in the shoe between said openings and the sides of the shoe.

6. A brake shoe comprising a cast metal body, presenting a homogeneous wearing surface and having a plurality of openings uniformly distributed in said surface and extending into said body and strengthening strips embedded in the shoe between said openings and the ends of the shoe.

5. 7. A brake shoe comprising a cast metal body presenting a homogeneous wearing surface, and having a plurality of openings uniformly distributed in said surface and extending into said body and strengthening strips embedded in said body surrounding the area provided with openings and adjacent the sides and ends of the shoe.

In witness whereof, I hereunto subscribe my name this 23rd day of May, A. D. 1916.

CHARLES W. ARMBRUST.

Witnesses:
A. L. JONES,
HAZEL A. JONES.

Copies of this patent may be obtained for five cents each, by addressing the "Commissioner of Patents, Washington, D. C."